Aug. 8, 1933.        J. H. MURCH        1,920,999
SHEARING MACHINE
Filed Feb. 13, 1929          9 Sheets-Sheet 1

Fig. 1

INVENTOR
BY John H. Murch
John C. Carpenter
ATTORNEY

Aug. 8, 1933.   J. H. MURCH   1,920,999
SHEARING MACHINE
Filed Feb. 13, 1929   9 Sheets-Sheet 6

Aug. 8, 1933.        J. H. MURCH        1,920,999
SHEARING MACHINE
Filed Feb. 13, 1929        9 Sheets-Sheet 9

INVENTOR
John H. Murch
BY John C. Carpenter
ATTORNEY

Patented Aug. 8, 1933

1,920,999

UNITED STATES PATENT OFFICE 1,920,999

SHEARING MACHINE

John H. Murch, East Orange, N. J., assignor to American Can Company, New York, N. Y., a Corporation of New Jersey Application February 13, 1929. Serial No. 339,553

12 Claims. (Cl. 164—48)

This invention relates to an apparatus for shearing or cutting blanks or strips from a sheet.

It is the present custom where automatic machinery is employed to cut a number of articles from a sheet of tin plate or the like to first sever the sheet into blanks or strips by a shearing machine and subsequently to feed the blanks so obtained through a press for the cutting of the desired articles. It is the common practice when the articles are of circular configuration such, for example, as can ends, to cut the same from the sheet in staggered relation, this permitting a more economical cutting action. Shearing machines of this nature ordinarily cut a blank having a scroll or undulated edge and a row of can end providing spaces, this permitting the same economy in the subsequent cutting of the can ends or articles therefrom as is obtained when the staggered layout is used by cutting directly from the sheet.

The present invention contemplates the shearing of a blank or strip containing a double staggered row of can ends providing spaces and embodies means for also shearing double row and single row blank combinations from the same sheet. The double row blank which may or may not contain a short and a long row of can ends providing spaces is subsequently passed through a double die press. Such a press has a greater output than the usual single die press. Combination single and double row blank cutting permits the use of more nearly standard sizes of sheets to provide blanks for certain diameters of can ends, such sheets often containing space for a number of double row blanks with a remainder large enough for only a single row blank.

A principal object of the present invention is the provision of apparatus for feeding a sheet to a shearing mechanism and for severing blanks of different widths therefrom.

A further important object of the invention is the provision of a single edged shearing mechanism for cutting blanks of different sizes.

Another important object of the invention is the provision of regular shearing dies, end dies, and gauge referencing dies acting on a sheet for obtaining therefrom a blank from which certain unsuitable end pieces have been removed and on which certain gauging edges have been formed.

Still another important object of the invention is the provision of feeding devices and single scroll edged shearing dies acting in certain combinations to produce a blank containing a predetermined number of can ends providing spaces.

A further object of the invention is the provision of an improved form of blank shearing apparatus having increased capacity, greater rigidity of elements, and freer accessibility for repair or replacement of wearing surfaces.

Numerous other objects and advantages of the invention will be apparent as it is better understood from the following description, which, taken in connection with the accompanying drawings, discloses a preferred embodiment thereof.

Referring to the drawings.

The apparatus disclosed in the drawings comprises an arch supporting frame, the side walls of which carry a bed or table over which the sheets to be sheared are moved. The frame is reinforced to insure a rigid construction and to form a proper support for a crank shaft carrying two cranks. The crank shaft is mounted in bearings detachably secured within the frame, this construction permitting easy replacement and repair of those parts of the bearings and shaft most subject to wear.

The shearing mechanism comprises a movable shearing die carried by a crosshead formed with elongated side walls having sliding movement within the frame. This elongated construction presents more sliding surface for the crosshead and insures smoother actions with less torsional strains. The die carried by the crosshead cooperates with a stationary die mounted on the frame, these dies constituting the shearing assembly. The two cranks of the crank shaft are connected to the crosshead and form the driving elements for the same, this double connection permitting the use of a wider die and a more exact alignment of coacting die surfaces. The crosshead also carries end dies coacting with stationary dies carried on the frame, these die units acting on the sheet as recovery members for removing certain end pieces not needed in the resulting blanks.

Gauge referencing dies, by which I mean dies which cut away edge-portions of the sheet to produce edges by which the blanks are accurately fed in the disk-cutting press, wherein the can ends are punched-out, are also carried by the crosshead and coact with stationary dies mounted on the frame, these latter die units forming certain gauge edges in the sheet and on the resulting blanks to permit their subsequent handling in an automatic press. The sheet is properly timed and positioned for the different operations of the described die units by feeding devices cooperating with gauging elements. A continuously moving chain conveyor delivers the sheet onto the table and onto reciprocating feeding bars. Upon each reciprocation of the bars the sheet is advanced a given distance and held at rest while the bars return for another stroke. Different operations are performed on the sheet at each period of rest and these will now be described. A double short and long row and a single long row blank is selected for purposes of illustration.

A lateral shifting or gauging action is performed upon the sheet when first positioned upon the table and a side edge is brought into engagement with a gauge plate. Following this action feed-back rollers move the rear edge of the sheet into feed dogs carried by the feed bars. The sheet is thus positioned for the first cutting action, the position of the sheet in relation to the die units being diagrammatically shown in Fig. 16.

A sheet A in the first position of cutting is engaged by end dies 21 and gauge referencing dies 22 arranged on opposite sides of the forward edge of the sheet, the former removing the forward corners, the latter forming notches adjacent thereto (Fig. 16), this operation being termed the preliminary cutting operation. Shearing dies 23 during this operation are positioned forward of and spaced from the forward edge of the sheet and during the preliminary cutting operation have no effect thereon.

Figures 15, 16, 17, 18:
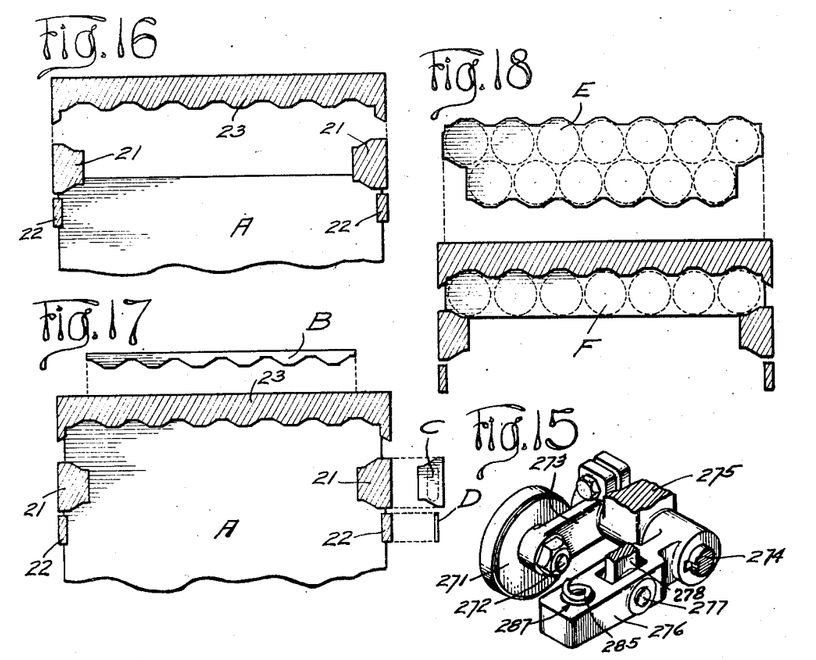
Fig. 15 is an enlarged perspective detail of the feed-back roller mechanism, parts being broken away.
Figs. 16, 17 and 18 are diagrammatic sectional and plan views of a portion of a sheet and parts of the shearing, end, and gauge referencing dies, each view illustrating different cutting operations.

The feed bars then move the sheet A into its second position, as shown in Fig. 17. Upon operation of the die units, this being termed the "trimming operation", shearing dies 23 form the scroll edge of the forward end of the sheet by cutting a trim B therefrom. At the same time the dies 21 remove end pieces C and dies 22 again notch the sheet and in so doing remove waste pieces D. It will be understood that pieces B, C, and D are shown in fanciful positions separated from the die parts, this being done to disclose their shape. The distance across the sheet in line with the spaces from which the end pieces C have been removed, following the trimming operation, is equal to the length of the short row (Fig. 18) of the double row blank sheared from the sheet at the next cutting operation. This width provides a predetermined number of can end spaces in the short row. The full width of the sheet provides a predetermined number of spaces for the long row, being one more than in the short row.

The sheet A is then moved to its third cutting position and upon operation of the die units, this being the blank forming operation, the double row blank E (Fig. 18) is removed. The machine disclosed in the drawings contemplates three blank forming operations and the removal of three double row blanks E with a remainder single row blank F. The number of double or double and single row blanks will vary according to the length of the sheet A. The position of parts in the last forming blank operation is illustrated in Fig. 18. Following this operation, blank F is removed from the dies by a second reciprocating feeding device.

Figure 1:
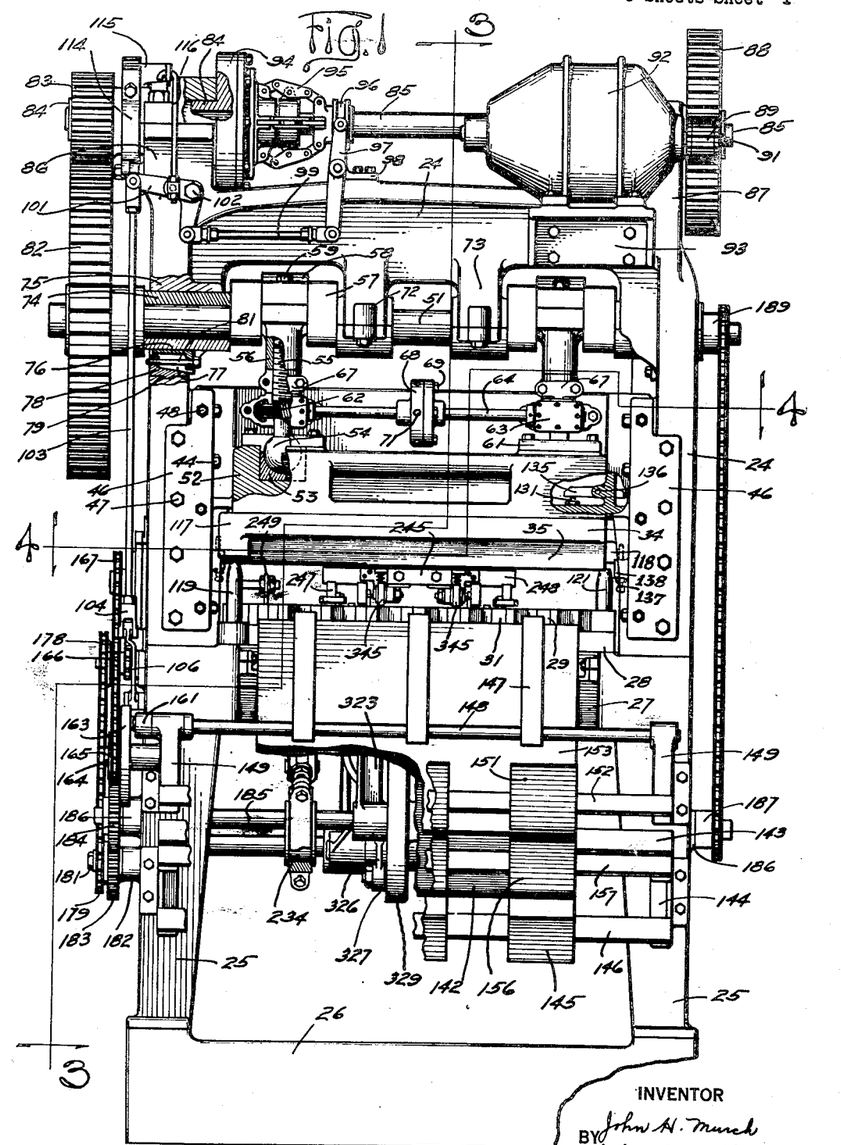
Figure 1 is a front elevation of the apparatus viewed from the forward or discharge end, parts being broken away.
Figure 2:
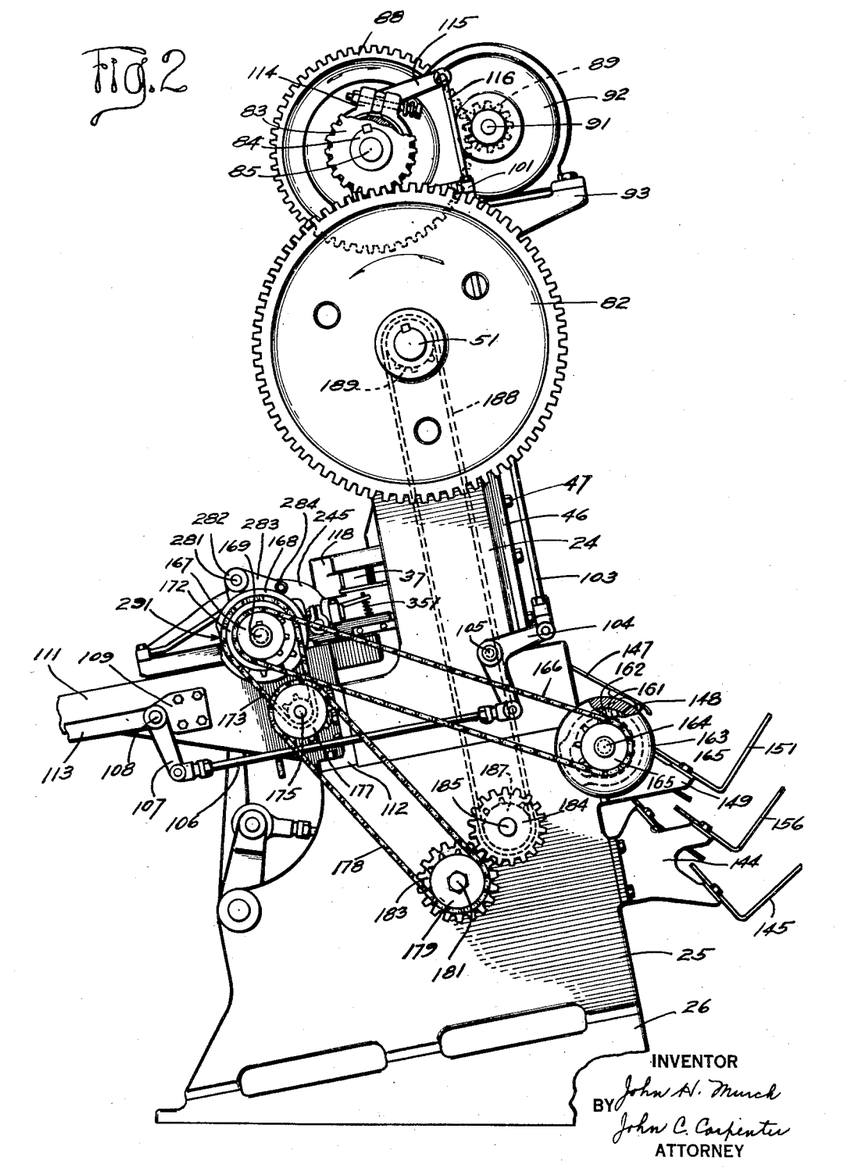
Fig. 2 is a side elevation of the apparatus, parts being broken away.

The principal supporting frame parts of the apparatus are disclosed in Figs. 1 and 2 and consist of an arch frame 24, the side walls of which are mounted on side frames or legs 25 which in turn are carried by a base 26. The upper surface of base 26 is inclined (Fig. 2) and supports the apparatus in an angular position, such as is usually employed in machines of this class.

Figure 10:
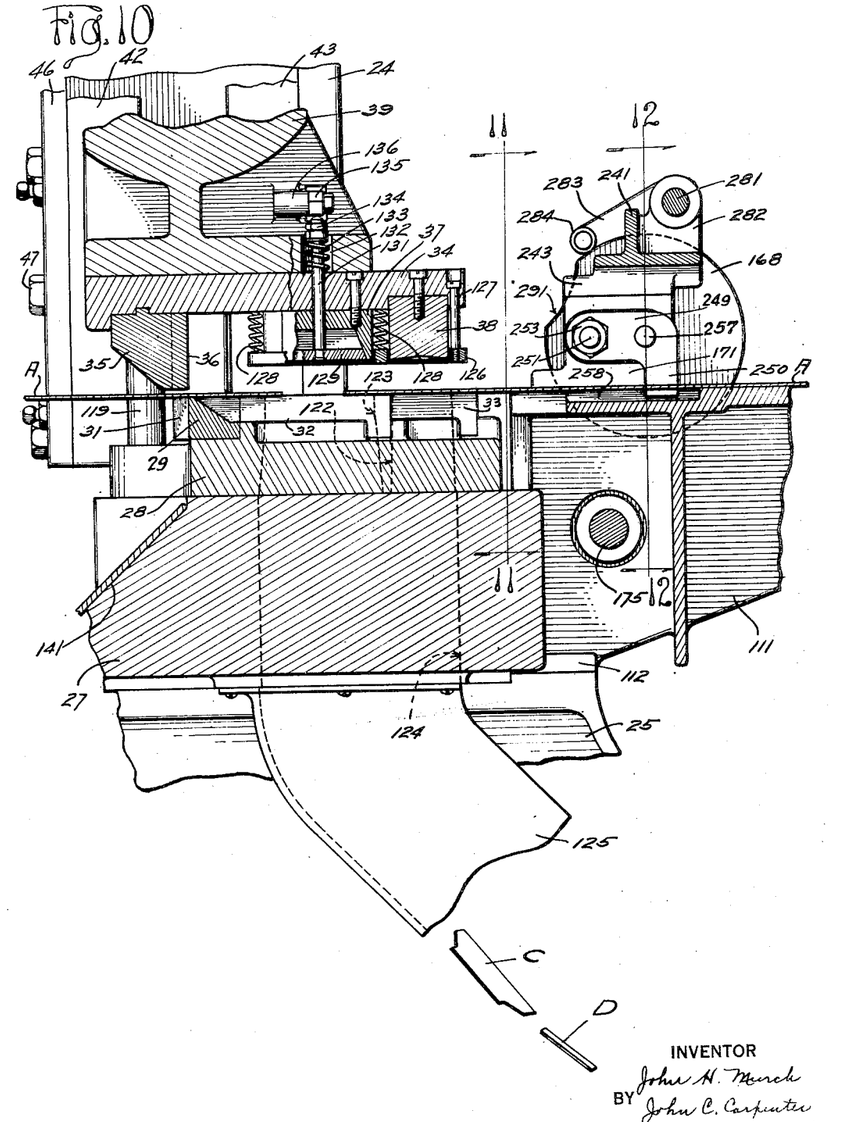
Fig. 10 is a longitudinal sectional view of parts of the shearing mechanism.

The shearing mechanism comprises stationary and movable members, these being disclosed in detail in Fig. 10. The stationary member comprises a bolster plate 27 which may be an integral part of the arch frame 24. The bolster plate supports the lower elements of the cutting dies, a die block 28 being carried on the upper surface of the said plate. A lower die edge 29 having a scroll or undulating surface 31 is carried by the die block 28 and die edges 32 and 33 are also mounted upon the block. Die edges 32 constitute the lower cutting elements of the end dies 21 and die edges 33 constitute the lower cutting elements of the gauge referencing dies 22.

The movable parts of the cutting dies are carried by a punch plate 34 to which is secured an upper cut edge 35 having a scroll or undulating surface 36 adapted to cooperate with the surface 31 of the lower cut edge 29. Cut edges 37 and 38 are also carried by the punch plate 34 and constitute the upper cutting elements of the end dies and gauge referencing dies which cooperate with the cut edges 32 and 33. The punch plate 34 is carried by a crosshead 39 which has extended side walls 41, these walls constituting the sliding surfaces for co-action with certain parts of the frame 24.

Figure 4:
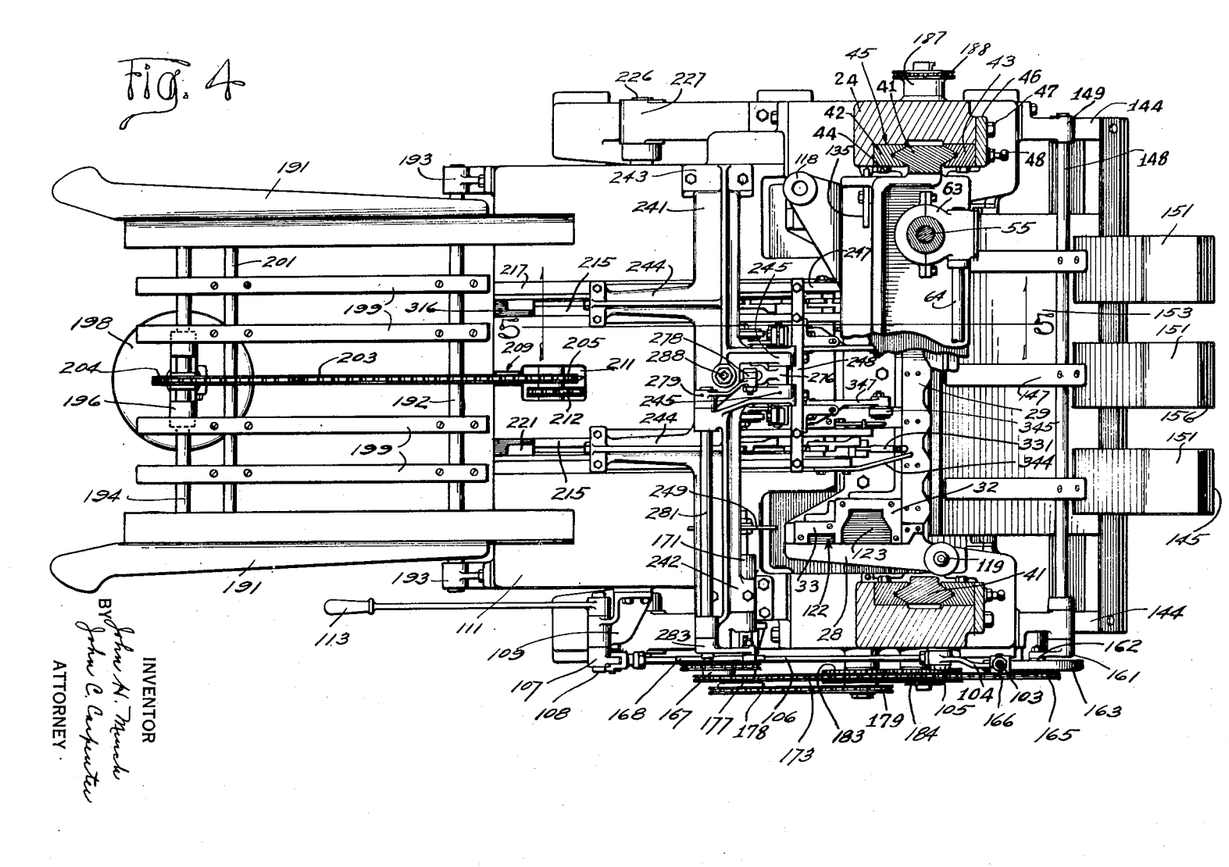
Fig. 4 is a plan sectional view taken substantially along line 4—4 in Fig. 1.

As illustrated in Fig. 4, each side wall is formed with tapered edges having sliding action within guideways formed in gibs 42 and 43 secured by bolts 44 within a recessed pocket 45 of the frame 24. The gib 43 constitutes an adjustable guideway for the side wall 41 and is held against the frame 24 and adjacent a side plate 46 secured by bolts 47 to the frame 24. Adjusting screws 48 are adjustably mounted on the plate 46 and engage one edge surface of the gib 43. By means of this construction the gib 43 on each side of the machine can be moved toward its associated gib 42, thus tightening the slideway against the side walls 41, the screws 48 being used for positioning the gibs 43 and the bolts 44 acting as final clamping elements (see also Fig. 1).

The crosshead 39 is raised and lowered within the guideways formed in the frame 24 by means of a crank shaft 51, said crosshead 39 being connected to the crank shaft by a pair of connecting devices. The crosshead 39 is formed with a pair of spaced pocketed reinforcements 52 (Fig. 1), in each of which is positioned a thrust block 53. A ball head 54 of a pitman stem is positioned against the thrust block 53 and forms a universal joint with the crosshead 39, as illustrated in Fig. 1. Each pitman stem 55 is threadedly secured within a pitman 56 passing over a crank 57 formed in the crank shaft 51. A pitman cap 58 held against the end of pitman 56 by bolts 59 completes the connection with the crank shaft.

There are two cranks 57 and two connecting devices for the crosshead 39, these insuring a balanced connection which permits the use of a wider crosshead 39. The ball head 54 of each pitman stem 55 is held in position against its thrust block 53 by means of a split retaining cap 61 bolted to the reinforcement 52.

Figure 3:
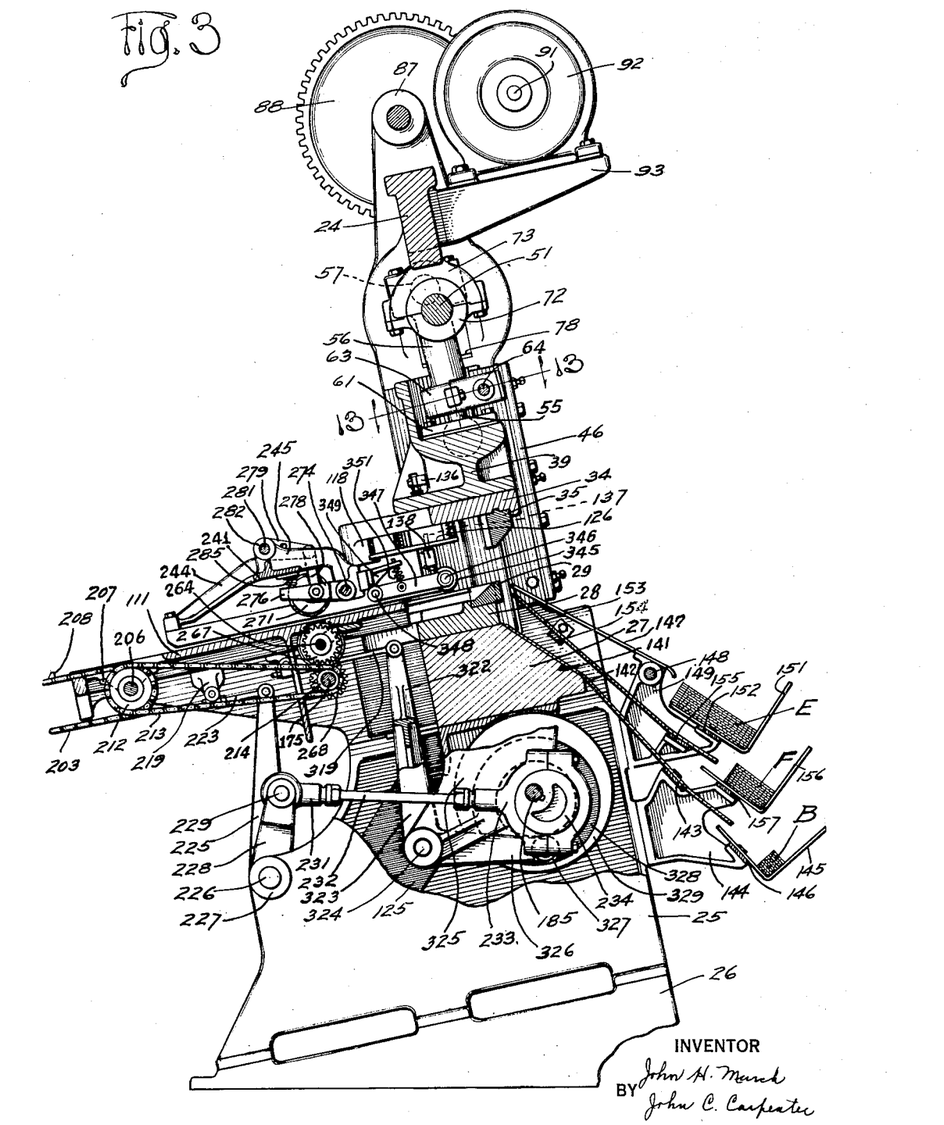
Fig. 3 is a longitudinal sectional view taken substantially along line 3—3 in Fig. 1.
Figures 11, 12, 13:
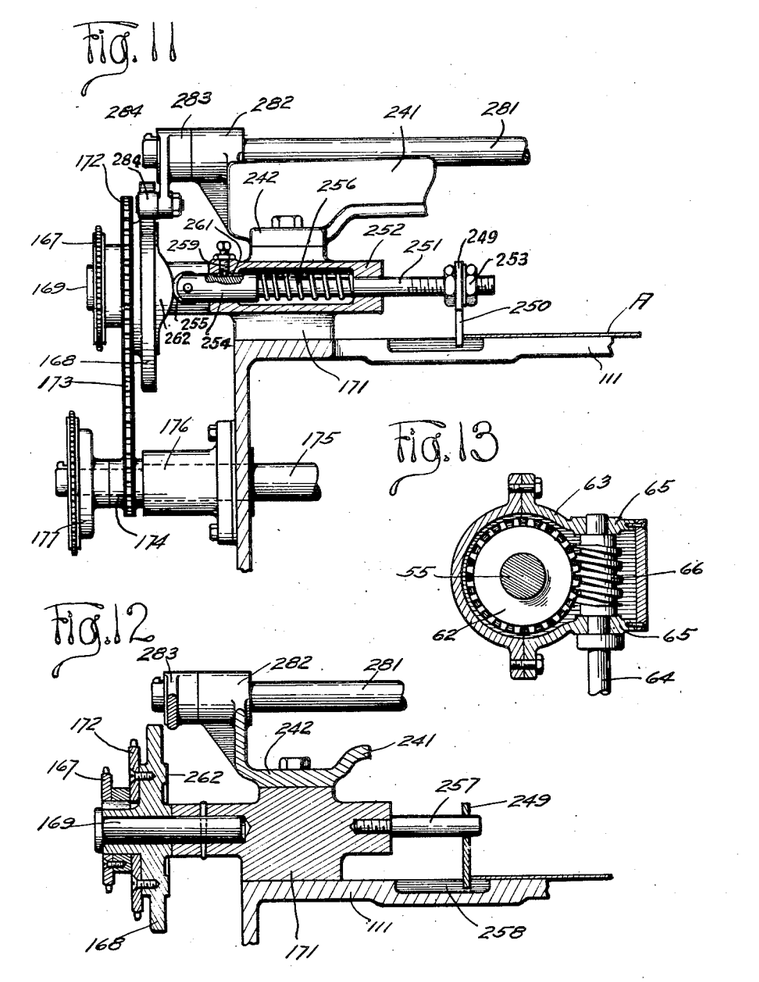
Fig. 11 is an enlarged fragmentary detail of part of the gauging device, the view being taken substantially along the line 11—11 in Fig. 10.
Fig. 12 is a similar fragmentary detail taken along the line 12—12 in Fig. 10.
Fig. 13 is an enlarged fragmentary detail taken substantially along the line 13—13 in Fig. 3.

Provision is made for adjusting the distance between each side of the crosshead 39 and the crank shaft 51 and this is accomplished by adjustment of each pitman stem 55 within its pitman 56. As illustrated in Figs. 1, 3 and 13, provision is made for turning each pitman stem 55 individually or turning both together. Each pitman stem 55 is formed with a spiral gear surface 62 and is encased in a housing 63 surrounding the stem 55. The worm gear 62 is engaged by a worm 66 formed on the end of an adjustment rod 64 having rotating movement in bearings 65 formed in the housing 63. When each adjustment rod 64 is turned about its own axis the pitman stem 55 associated therewith is turned by reason of the worm and gear action just described. After an adjusted position is made, the pitman stem 55 is held in fixed position by means of a locking plate 67 bolted to the lower end of its associated pitman 56. The inner extremities of the two rods 64 carry flanged collars 68 which are secured together by means of nuts 69. Spanner holes are formed radially of one of the collars 68 and permit turning of the collars and the rods carried thereby.

By loosening the nuts 69 each rod 64 can be individually adjusted and then the collars 68 are connected together as explained. Turning of the collars 68 and rods 64 through the worm gear connections turns both pitman stems 55. By means of this construction it is evident that the crosshead 39 may be adjusted relative to the crank shaft 51 by being moved bodily or by having one side thereof adjusted independently of the other side.

The crank shaft 51 (Fig. 1) is journaled in intermediate bearings 72 formed on brackets 73 projected from the frame 24. The shaft is also journaled in split sleeve bearings 74 clamped at 75 in each of the side walls of the frame 24. The sleeve 74 is held in clamped position by means of a sliding wedge 76 having an inclined surface 77 engaging the inclined surface of an insert 78 formed with a tongue and groove connection 79 within the frame 24. A draw bolt 81 is threaded in the insert 78 and passes through the outer extension of the wedge 76 and upon turning of the said bolt within its threaded seat the wedge 76 is drawn tightly against the lower part of the sleeve 74. This construction also permits easy replacement of the bearing surfaces for the crank shaft 51 without necessitating the reboring of the heavy side frame parts.

Rotation is imparted to the crank shaft 51 by means of connection with an electric motor. A spur gear 82 is secured to one extremity of the crank shaft 51 and meshes with a pinion 83 mounted on a sleeve 84 loosely positioned on a drive shaft 85. The sleeve 84 and one end of the shaft 85 carried thereby is mounted for rotation within a bearing 86 formed in an extension of the frame 24. The opposite end of the drive shaft 85 rotates in a bearing 87 projected from the frame 24 (see also Fig. 3). Drive shaft 85 also carries a spur gear 88 which meshes with a pinion 89 carried on a motor shaft 91 of an electric motor 92 supported upon a bracket 93 bolted to the frame 24.

Any suitable form of clutch designated in general by the numeral 94 is mounted upon shaft 85 and extends within the sleeve 84 and forms a means for connecting the sleeve 84 and the shaft 85 when the clutch is engaged. The moving parts of the clutch 94 may constitute the usual toggle link mechanism 95 operated by a collar 96 positioned on the shaft 85. The clutch 94 is thrown into and out of clutched position to connect and disconnect gear 83 with shaft 85 by means of a lever 97 pivoted on a bracket 98 carried by the frame 24 (see Fig. 1). The opposite extremity of lever 97 is connected by a link 99 with a bell crank lever 101 pivoted upon a stud 102 and connected by a rod 103 with one arm of a bell crank lever 104 (Fig. 2).

Figure 14:
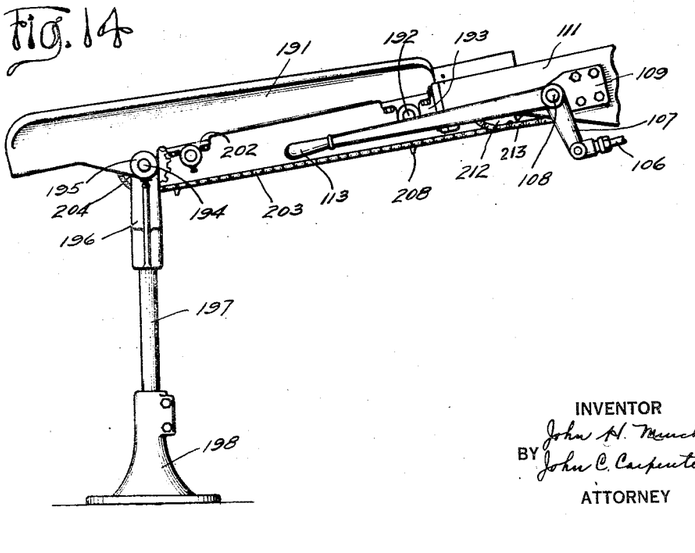
Fig. 14 is an enlarged side elevation of the feed-in table, parts being broken away.

The bell crank lever 104 is pivoted upon a stud 105 projected from one of the side walls of the arch frame 24 and is pivotally connected to a rod 106 which connects with an arm 107 secured to a rock shaft 108 oscillating within a bracket 109 bolted to a side wall of a table 111. The table 111 constitutes the principal supporting surface for the sheet A as it is fed into the machine and is secured on opposite sides and at its forward end 112 to the frames 25 and the side walls of the arch frame 24. As illustrated in Figs. 4 and 14, the rock shaft 108 carries a hand lever 113 which forms a manual control for the clutch mechanism as just described.

When the clutch 94 is operated to engage the sleeve 84 with the rotating shaft 85, the crank shaft 51 is rotated and crosshead 39 is raised and lowered in its guideways. When the clutch 94 is shifted to unclutched position, the sleeve 84 is disconnected from the rotating shaft 85 and a band brake 114 of the usual type operates to immediately stop rotation of the crank shaft and associated parts. The brake 114 is connected by means of an arm 115 and a rod 116 with the bell crank lever 101 and is governed by the movement of the said lever.

As the crosshead 39 is moved downwardly it is accurately centered by means of a pilot device illustrated in Figs. 1 and 4. This device comprises extension apertured bosses 117 and 118 projected from the forward and rear faces of the punch plate 34. Each apertured boss 117 and 118 moves respectively over a pilot stud 119 and 121 carried by the die block 28. This insures an exact registration of the cut edges of the die units when the crosshead 39 is in lowered position. As the punch plate descends, carrying the cut edges 35, 37 and 38, parts of the sheet are removed according to its relative position as previously described. As the cut edge 38 cooperates with its cut edge 33, the waste piece D is removed from the sheet A and falls through an opening 122 formed in the die block 28 (see Fig. 10). In like manner as cut edge 37 cooperates with cut edge 32 a recovery piece C, or the clippings of the corner of the sheet, as previously described, falls through an opening 123 formed in the die block. Both openings 122 and 123 (Fig. 4) communicate with an opening 124 cut through the bolster plate 27 as indicated in dotted lines in Fig. 10. The opening 124 communicates with the interior of a discharge chute 125 secured to the under surface of the bolster plate 27. This forms a channel on each side of the machine for conducting the recovery pieces C and the waste pieces D away from the die mechanism.

After a cutting operation by the end piece and gauge referencing die units, provision is made for stripping the sheet A from the cut edges 37 and 38. This consists of a stripper plate 126 (Fig. 10) carried by pins 127 extending through vertical openings formed in the punch plate 34. Pins 127 slide within the punch plate 34 and the stripper plate 126 is normally held outwardly pressed by coil springs 128 interposed between the stripper plate 126 and the punch plate 34. This construction permits passing of the cut edges 37 and 38 through the sheet A and beyond stripper plate 126 to insure a stripping of the sheet A upon the raising of the punch plate 34.

Provision is also made for stripping each end piece C from the cut edge 37. This comprises a knockout pad 129, positioned within the cut edge and carried upon the lower end of a sliding knockout rod 131 passing through an opening formed in the punch plate 34 and through opening 132 cut in one wall of the crosshead 39. A coil spring 133 is interposed between the upper surface of the punch plate 34 and lock nuts 134 carried on the pin 131 and this insures a normally raised position of the knockout pad 129 within the cut edge 37. The upper end of the knockout rod 131 is positioned beneath the arm of a lever 135 (Figs. 1 and 3) which is pivoted at 136 to the crosshead 39. The opposite end of the lever 135 projects beyond the outer wall of the crosshead 39 and as the latter is brought into its lowered position strikes against an adjusting bolt 137 adjustably secured within a base 138 formed on the frame 24. This insures a lowering of the knockout pad 129 to discharge the end piece C into the opening 123 when the crosshead 39 has reached its lowermost travel.

As the cut edges 35 and 29 cooperate for the shearing cut, the parts severed fall into one of three receptacles (see Fig. 3). The first trimming action on sheet A severs the trim B from its forward edge and the trim falls by gravity over an inclined forward face 141 formed in the bolster plate 27 and upon a plate 142 carried by the bolster plate. The plate 142 is secured at its lower extremity to a cross bear 143 carried by two spaced brackets 144 bolted to the forward faces of the side frames 25. After trim B moves by gravity over the plate 142 it falls off the lower end thereof and into a number of spaced angle holders 145 secured to a cross bar 146 mounted upon the brackets 144 (see also Figs. 1 and 4). After the trimming operation, the sheet A is advanced as previously described and upon severing of the double row blank E the same falls by gravity upon spaced slats 147 mounted upon a rock shaft 148 carried by two spaced brackets 149 bolted to the forward faces of the side frames 25. As the blank E slides by gravity over the lower ends of the slats 147 the same falls within spaced angle holders 151 secured to a cross bar 152 carried by the brackets 149. In the event that there are three blank forming operations and three double row blanks cut from a single sheet A, slats 147 are held in the position illustrated in Fig. 3 to permit collecting of the blanks E within the angle holders 151.

After the last blank forming operation is performed the rock shaft 148 is oscillated within its bearings and the slats 147 carried thereby are lifted from their normal position. The normal position is shown in Fig. 3. Following this lifting action the discharge of the single row blank F takes place, it falling upon a plate 153 carried by a cross bar 154 secured to the side walls of frame 24 and by a cross bar 155 secured to the brackets 149. Blank F moves by gravity over the plate 153 and off of the lower end thereof, and falls within spaced angle holders 156 carried by a cross bar 157 mounted upon the brackets 144.

The mechanism for oscillating shaft 148 and moving slats 147 in proper time with the operation of the other operating parts of the machine is illustrated in Figs. 1 and 2. Shaft 148 at one extremity carries an arm 161 to which is pivotally secured a cam following roller 162 moving in the groove of a face cam 163 loosely mounted upon a stud 164 carried by one of the brackets 149.

Cam 163 is formed integrally with a sprocket 165 over which operates a chain 166 which engages a sprocket 167 keyed to a cam 168 loosely mounted upon a stud 169 carried in a block 171 secured to the table 111 (see Figs. 11 and 12). A sprocket 172 is secured to cam 168 and carries a chain 173 which operates at its lower end of travel over a sprocket 174 secured to a shaft 175 mounted in bearings 176 carried by the table 111. Shaft 175 also carries a sprocket 177 (Fig. 2) over which operates a chain 178 moving at its opposite line of travel over a sprocket 179 rotatably mounted on a stud 181 projected from one face of side frame 25. The sprocket 179 is formed integrally with a spur gear 183 which meshes with a corresponding gear 184 secured to a horizontal shaft 185 journaled in bearings 186 carried by side frames 25 (see also Fig. 1). Shaft 185 carries at its opposite extremity a sprocket 187 over which operates a chain 188 passing at its upper end of travel over a sprocket 189 secured to the crank shaft 51. By means of the described connections rotation is transmitted from the crank shaft 51 to the cam 163 which oscillates the shaft 148 and raises and lowers slats 147 to permit proper discharge of blank F upon each final blanking operation.

The mechanism for transferring the sheet A over the surface of table 111 will now be described and reference should be had to Figs. 4 and 14. An auxiliary table comprising spaced side walls 191 carries a cross shaft 192 pivoted in brackets 193 secured to the rear end of table 111. The outer rear ends of the walls 191 carry a shaft 194 journaled in bearings 195. A supporting bracket 196 is mounted over the shaft 194 and is carried upon the upper end of a supporting rod 197 adjustably secured within a base 198. By means of the adjustment of rod 197 within the base 198 different heights of the table may be obtained, the table pivoting about the shaft 192 during this adjustment. Sheets are brought into the machine between the side walls 191 of the auxiliary table and rest upon spaced slats 199 mounted upon the shaft 192 and upon a spacer rod 201 secured within brackets 202 carried by the walls 191. A conveyor chain 203 operates centrally of the auxiliary table and passes over an idler sprocket 204 carried by the shaft 194 and over a drive sprocket 205 secured to a shaft 206 carried in brackets 207 (Fig. 3) secured to the table 111. The conveyor chain 203 moves beneath the sheet resting upon the slats 199 and one of a number of spaced flights 208 carried by the chain 203 engages the rear edge of the sheet A and conveys it toward the right, as viewed in Figs. 3 and 14. The forward upper run of the conveyor chain 203 passes within a slot 209 (Fig. 4) formed in the table 111 and a similar slot 211 cut through the table top affords clearance for sprocket 205.

Shaft 206 is continuously rotated (Fig. 3) by connection with shaft 175, this connection comprising a sprocket 212 secured to shaft 206 over which operates a chain 213 which passes over a sprocket 214 carried by the shaft 175. Sheets A are thus moved from the auxiliary table to the upper surface of the main table 111, the same being brought into position where the sheet is engaged by the feeding mechanism now to be described.

Figure 5:
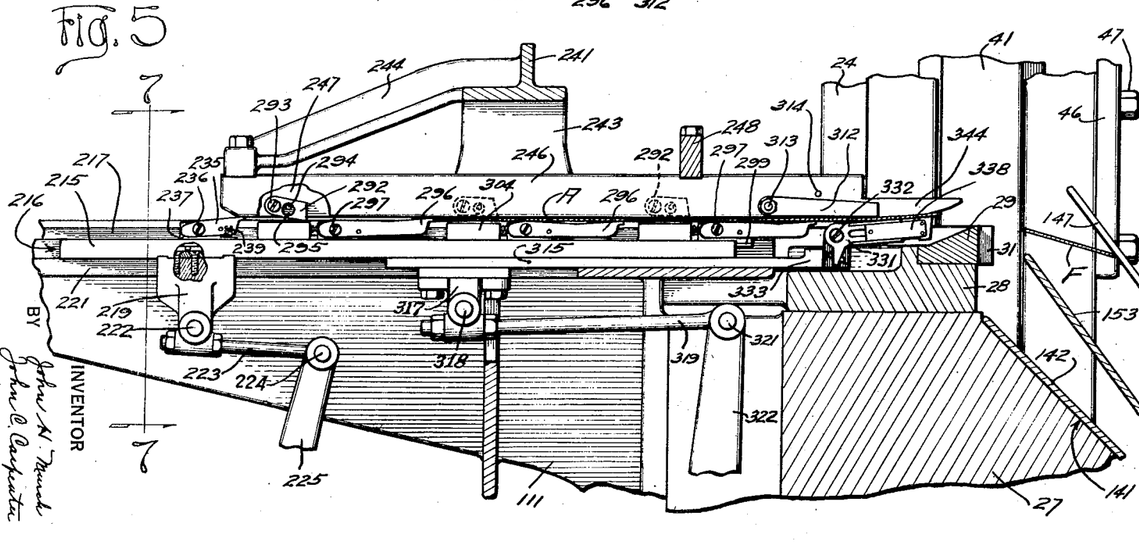
Fig. 5 is an enlarged cross-sectional view taken substantially along line 5—5 in Fig. 4, parts being omitted.
Figure 7:
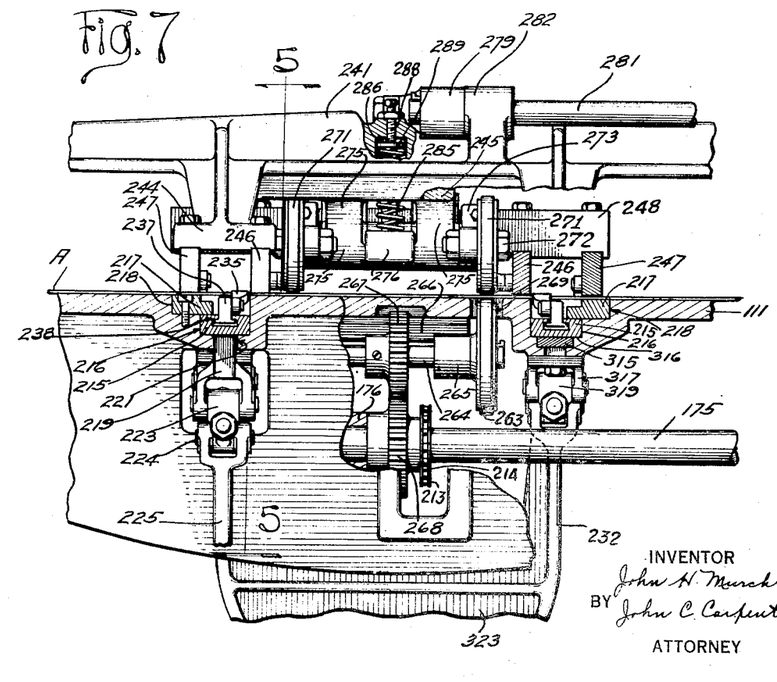
Fig. 7 is an enlarged transverse sectional view taken substantially along line 7—7 in Fig. 5.

The first of the feeding devices to operate upon the sheet comprises a pair of feeding bars 215 sliding within slideways 216 formed in the table 111 (see Figs. 5 and 7). Each bar 215 is held within its slideway by a bar 217 seated within a slot 218 formed in the table 111. Each bar 215 carries near its rear extremity a block 219 which moves within a slot 221 formed in the table 111 directly beneath the slideway 216. Each block 219 (Fig. 3) is pivotally connected at 222 to a connecting rod 223 in turn pivoted at 224 to the upper end of an arm 225 secured to a rock shaft 226 oscillating in bearings 227 formed in the side frames 25. There being two feed bars 215, there will also be two arms 225, both of which are secured to the rock shaft 226. Shaft 226 also carries an arm 228 which is pivoted at 229 to the extremity 231 of a connecting rod 232 which is secured at its opposite end within an eccentric strap 233 mounted upon and operating over an eccentric 234 secured to the shaft 185.

Through the described mechanism it is evident that oscillation of the shaft 226 results in a to and fro movement of the feed bars 215.

Each feed bar 215 carries a rear dog 235 pivoted at 236 to a block 237 adjustably secured within a slot 238 (Fig. 7) formed longitudinally of the bar 215. A coil spring 239 is positioned between the block 237 and the forward end of the feed dog 235 and holds the latter normally in raised position, as illustrated in Fig. 5. It is against the forward edge of the two rear dogs 235 that sheet A is positioned for its first or preliminary cutting operation, as previously described and as illustrated in Fig. 16. Prior to the cutting operation sheet A is gauged laterally upon the table 111 and is also positively moved backward against the two feed dogs 235. This gauging and feed-back mechanism will now be described.

As sheet A is positioned upon the upper surface of the table it is moved under guide rails carried by a frame construction illustrated in Figs. 4, 5 and 11. Frame 241 is of arch construction, one foot 242 being secured to the block 171 and the opposite foot 243 being bolted to the table 111. Frame 241 carries spaced backwardly extending arms 244 and forwardly extending arms 245.

An inner guide rail 246 and an outer guide rail 247 (Fig. 7) are secured to and supported by each arm 244, the forward end of each guide rail 246 and 247 being secured to and supported by a cross frame 248 carried by the forward end of arms 245. The lower surface of each guide rail 246 and 247 is spaced a slight distance above the surface of the table 111 and forms a pass for sheet A as it is moved through the machine.

Sheet A on being brought to its forward position by conveyor chain 203 is first operated upon by the gauging device which shifts the same laterally into proper position for the first preliminary cutting operation. The gauging mechanism is illustrated in Figs. 4, 10, 11 and 12 and comprises a shifting gauge plate 249 adjustably positioned on the inner extremity of a horizontal rod 251 sliding within a sleeve 252 formed as an integral part of block 171, the plate being held in adjusted position by the nuts 253. The opposite end of the rod 251 is enlarged as at 254 and carries a cam following roller 255. Rod 251 is normally held in outer position by a coil spring 256 positioned over the rod 251 and interposed between the shoulder formed by enlargement 254 and an end wall of the sleeve 252.

Plate 249 also extends over a stud 257 projecting from the inner face of block 171, the plate having loose sliding movement thereover. This insures the proper alignment of the plate 249 as it is moved back and forth for gauging purposes. A lower end 250 (Figs. 10 and 11) of the plate 249 moves within a slot 258 formed in the table 111. A set screw 259 is projected through the sleeve 252 and rests with its forward end within a slot 261 cut in the enlarged end 254 of rod 251 and prevents turning of the said rod about its own axis, at the same time permitting sliding movement.

As sheet A is brought into position adjacent the gauge plate 249 the latter is in backward position, this being toward the left, as viewed in Fig. 11. Upon sliding movement of the rod 251 the inner face of plate 249 engages one edge of the sheet A and moves it into central position upon the table. A cam following roller 255 engages a cam surface 262 formed on the cam 168. As cam 168 rotates as previously described, the cam surface 262 cooperates with the sliding rod 251 to cause it to move sheet A into centralized position just prior to the preliminary cutting operation.

With the sheet in centralized position, the same is moved backward into contact with the feed dogs 235 by means of a mechanism now to be described.

Reference should be had to Figs. 3, 4, 7, 11, and 15, which disclose feed-back rollers and mechanism associated therewith. Lower feed rollers 263 are mounted upon opposite ends of a horizontal shaft 264 journaled in bearings 265 formed in a bracket 266 secured beneath table 111. Shaft 264 carries intermediate its length a spur gear 267 which meshes with a corresponding gear 268 carried by the shaft 175 (Fig. 7). Rollers 263 are thus continuously rotated, the upper run of the rollers moving in a direction opposite to the direction of the forward movement of the sheet A. Rollers 263 extend into slots 269 formed in table 111 and the upper surface of each roller is tangent to the upper surface of table 111. Each roller 263 carries a rubber or other frictional surface. As sheet A is moved over the surface of the table and over the constantly rotating rollers 263, the latter have no effect upon the travel of the sheet until the sheet is brought down into engagement with the frictional surfaces thereof.

Upper feed rollers 271 also covered with suitable frictional material are mounted for rotation each upon a stub shaft 272 carried in an arm 273 clamped to a rock shaft 274 oscillating within bearings 275 formed in the arms 245 (see Figs. 7 and 15). Each roller 271 is positioned directly above a corresponding roller 263 and is normally held spaced therefrom by a cam controlled device operating directly upon the rock shaft 274.

Shaft 274 carries an arm 276 to which is pivoted at 277 a link 278 pivotally connected to an arm 279 keyed to a rock shaft 281 oscillating in bearings 282 formed on frame 241 (see Figs. 3, 7 and 11). Rock shaft 281 carries an arm 283 which carries at its outer end a cam following roller 284 resting against the peripheral cam surface of cam 168. A coil spring 285 is positioned within a channel 286 formed in frame 241 and within a channel 287 (Fig. 15) formed in arm 276, and tends to separate the forward end of the arm 276 from the frame 241 positioned above. Spring 285 holds shaft 281 and arm 283 in position to hold cam following roller 284 against the surface of the cam 168 as the latter turns about its axis 169. Compression of spring 285 is adjusted by means of an adjusting screw 288 (Fig. 7) threaded in a part of frame 241 and extending in contact with a pressure disk 289 positioned in channel 286.

As illustrated in Figs. 2 and 10, the peripheral surface of cam 168 is provided with a depression 291 which is moved adjacent the cam following roller 284 in each rotation of the cam 168. At such a time roller 284 enters the depression 291 of cam 168 and the shaft 281 is caused to oscillate under the action of the spring 285. This oscillating of shaft 281 is only momentary but is sufficient to permit a corresponding oscillation of shaft 274 and a lowering of the rollers 271. As rollers 271 are thus brought into engagement with the upper surface of sheet A they force the sheet downwardly into engagement with the upper peripheral surface of rollers 263. At such time the frictional surfaces on the rollers 263 and 271 cause the sheet to be moved backward into engagement with the feed dogs 235, this directly positioning sheet A for its preliminary cutting operation.

After sheet A has been subjected to the preliminary cutting operation, feed bars 215 are moved forward and carry the sheet into its second position preparatory to the trimming operation. In this advanced position, the sheet is again subjected to the gauging and feed-back roller operations just described. Following the trimming operation, feed bars 215 are moved backward, the sheet A being held in its forward position by a pair of stop dogs 292 pivoted at 293 to the rear end of outer guide rails 247 (see Fig. 5). Each dog 292 falls into position by gravity, a pin 294 carried by the rail 247 resting within an enlarged opening 295 formed in the body of the dog 292, and limiting pivotal movement of the dog.

Figure 8:
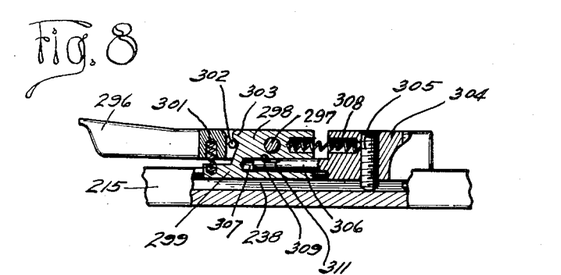
Fig. 8 is an enlarged sectional detail of one of the feed fingers.

Upon the next forward movement of feed bars 215 the rear edge of sheet A is engaged by a different set of feed dogs (Fig. 5) which will now be described. Each feed bar 215 carries a series of these dogs which are illustrated in detail in Figs. 5 and 8. The feed dog mechanism comprises a pivoted body 296 pivoted about a pin 297 carried on a sliding block 298 provided with a T-section 299 sliding within the groove 238 formed in bar 215. The forward end of the feed dog is normally held in raised position by a coil spring 301 interposed between the body 296 and the block 298. A stop pin 302 carried by body 296 and engaging a projection 303 formed in block 298 limits the upward movement of the body 296 under the influence of spring 301. Block 298 has yielding and sliding connection with a block 304 also resting within groove 238 of rail 215, a screw 305 clamping the block 304 in adjusted position. Block 304 is provided with an extension 306 sliding within a horizontal bore 307 formed in block 298 and a coil spring 308 is interposed between the blocks 298 and 304. By means of this connection, block 298 is yieldingly held in its forward position by engagement with the extension 306. A pin 309 is carried by the block 298 and has sliding movement within a slot 311 formed on extension 306, the walls of the latter at the ends of the slot forming limiting stops for the pin.

Spring 301 normally holds the body 296 of the dog in raised or sheet engaging position but permits its depression by the sheet when the dog is carried backwardly by bars 215. Upon each forward movement of the bars 215 and the feed dogs carried thereby the sheet is advanced through its various positions for the three blank forming operations previously described. Upon the backward movement of the bars 215 and the feed dogs carried thereby the latter move beneath the sheet, which is held in its various positions of rest by pairs of dogs 292 (Fig. 5) pivoted upon the outer rails 247 and spaced from each other a distance equal to the stroke of the feeding device. These dogs are duplicates of the dogs 292 previously described.

As sheet A is brought into its final blank forming position, this being the position illustrated in Fig. 18, the rear edge of the sheet is engaged by a dog 312 pivoted at 313 to each inner rail 246 (see Fig. 5). The dog 312 rests by gravity upon the upper surface of sheet A during its movement through the operating stations and falls to a position behind the edge of the sheet when the latter is at the final blank forming station. A stop pin 314 prevents upward displacement of the dog 312.

After the final blank forming operation of the shearing dies the strip F remains in the die mechanism. The second feeding device then operates to act as a discharge mechanism for removing the strip F from its place within the dies and positioning it within its blank receptacle. This discharge mechanism is illustrated in Figs. 5, 6, and 7, and comprises feed bars 315 operating within slideways 316 formed in table 111 directly beneath the slideways 216, the upper surface of bars 315 being in sliding contact with the lower surface of bars 215.

Bar 315 is connected adjacent its rear extremity to a block 317 pivoted at 318 to a connecting rod 319 in turn pivoted at 321 to the upper arm 322 of a bifurcated lever 323 (Fig. 3). The two arms 322 of lever 323 are thus associated with the two feed bars 318. Lever 323 is pivoted over a fixed shaft 324 carried by a bracket 325 secured to the bolster plate 27. The lever 323 also has an arm 326 provided with a cam following roller 327 operating within a cam groove 328 of a face cam 329 secured to shaft 185. Under the influence of cam 329 lever 323 is caused to oscillate about its shaft 324 and slides bars 315 back and forth in proper time with the various operations of the apparatus.

Figure 9:
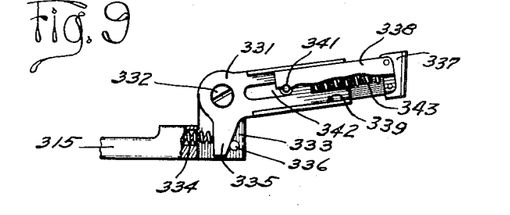
Fig. 9 is an enlarged elevational detail, with parts broken away of a different feed finger.

As disclosed in Fig. 5, each bar 315 carries a dog 331 pivoted at 332 to the forward extension 333 of the bar 315. Dog 331 (Fig. 9) is normally held in raised position by a coil spring 334 interposed between the forward end of the bar 315 and extension 335 of the dog 331. A stop pin 336 carried by the forward extension 333 limits the upward position of the dog 331. Dog 331 is provided with a sliding cap 337 secured between plates 338 moving in guideways 339 formed on opposite faces of dog 331. Plates 338 are connected at their rear end by a pin 341 moving within a slot 342 formed in dog 331 and this construction limits the forward position of cap 337 relative to the dog. A coil spring 343 is interposed between the cap 337 and the forward end of dog 331 and forms a resilient connection for the cap.

Figure 6:
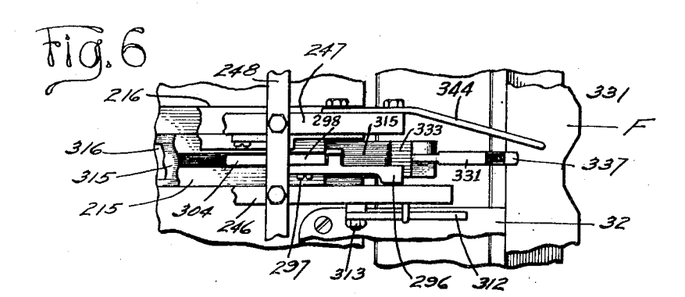
Fig. 6 is an enlarged fragmentary plan detail of part of the mechanism illustrated at the right-hand side of Fig. 5.

As illustrated in Figs. 5 and 6, sheet A during its movement through the apparatus and prior to its final discharge moves over the upper surface of the depressed dogs 331, which hold the forward end of the sheet against tapered guide extensions 344 secured to the outer guide rails 247. As sheet A moves to its final operating position, this holding action is important owing to the relatively narrow width of the sheet at that time. Following the final cutting action feed bars 315 are moved backward and dogs 331 snap upward placing their caps against the rear edge of blank F, this being all that is left of sheet A at that time. As feed bars 315 then move forward dogs 331 slide blank F from position and move it into its blank receptacle.

As illustrated in Figs. 1, 3, and 4, the sheet during its travel over table 111 is held down by depression rollers 345 idly rotating over pivots 346 carried by bars 347 pivoted at 348 to brackets 349 carried on the forward end of extensions 245. A coil spring 351 is interposed between brackets 349 and each bar 347 and normally holds its roller 345 against the surface of sheet A. This is in addition to the guide rails 246 and 247.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. In an apparatus for cutting blanks from metal sheets in shape to have can ends and the like formed therefrom, the combination of shearing mechanism, end dies operating on the sheets in a position in advance of the shearing mechanism to remove end pieces therefrom, and gauge referencing dies also operating on the sheets in a position in advance of the shearing mechanism for preparing gauge referencing edges in said sheets, said edges to be engaged by feeding means of the can end punching-out mechanism.

2. In an apparatus for cutting blanks from metal sheets in shape to have can ends and the like formed therefrom, the combination of shearing mechanism, end dies operating on the sheets in a position in advance of the shearing mechanism to remove end pieces therefrom, and gauge referencing dies also operating on the sheets in a position in advance of the shearing mechanism for preparing gauge referencing edges in said sheets, the shearing mechanism, end dies and gauge referencing dies being connected to and operated by the same actuating mechanism, said edges to be engaged by feeding means of the can end punching-out mechanism.

3. In a machine of the class described, the combination of shearing and trimming mechanism, said mechanism including shearing dies arranged one in advance of the other and arranged for simultaneous action, and means for advancing a sheet into position within the shearing mechanism, said means comprising a pair of feeding devices, constructed to advance the sheet a step equal to the width of two rows of can ends to be subsequently punched out from the strip the first device positioning the sheet for trimming, for individual, and for combination blank forming operations, the second device discharging the finally formed blank of the combination blank forming operation, and coordinated actuating instrumentalities for the shearing mechanism and the feeding devices.

4. In a machine of the class described, the combination of shearing and trimming mechanism, said mechanism including shearing dies arranged one in advance of the other and arranged for simultaneous action, and means for advancing a sheet into position within the shearing mechanism, said means comprising a pair of feeding devices constructed to advance the sheet a step equal to the width of two rows of can ends to be subsequently paneled out from the strip, the first device positioning the sheet for trimming, for individual, and for combination blank forming operations, the second device discharging the finally formed blank of the combination blank forming operation, and end dies operating on the sheet for removing end pieces prior to the cutting of the blanks.

5. In a machine of the class described, the combination of shearing and trimming mechanism, said mechanism including shearing dies arranged one in advance of the other and arranged for simultaneous action, and means for advancing a sheet into position within the shearing mechanism, said means comprising a pair of feeding devices constructed to advance the sheet a step equal to the width of two rows of can ends to be subsequently paneled out from the strip, the first device positioning the sheet for trimming, for individual, and for combination blank forming operations, the second device discharging the finally formed blank of the combination blank forming operation, and end dies, and gauge referencing dies operating on the sheet in a position in advance of the shearing mechanism, for respectively forming certain outline edges and certain gauge referencing edges for the blanks formed in the blank forming operations.

6. In a machine of the class described, the combination of shearing mechanism, said mechanism including shearing dies arranged one in advance of the other and arranged for simultaneous action, means for advancing a sheet into position within the shearing mechanism, devices for gauging the sheet relative to the advancing means, other devices for gauging the sheet relative to the shearing mechanism, said advancing means comprising a feeding device for positioning a sheet for blank forming operations and constructed to advance the sheet a step equal to the width of two rows of can ends to be subsequently paneled out from the strip, and a second feeding device operating on the sheet after the final action of the shearing mechanism to discharge the sheet therefrom.

7. An apparatus for cutting from metal sheets, blanks formed of a double row of can ends providing spaces and also blanks formed of a single row of can ends providing spaces, comprising shearing mechanism, said mechanism including shearing dies arranged one in advance of the other and arranged for simultaneous action, for severing said double and said single row blanks from the sheets, and feeding devices operating in timed relation with the shearing mechanism and constructed to advance the sheet a step equal to the width of two rows of can ends to be subsequently paneled out from the strip for feeding the sheets thereto for a double row cutting and a double and single row final cutting.

8. An apparatus for cutting from metal sheets, blanks formed of a double row of can ends providing spaces and also blanks formed of a single row of can ends providing spaces, comprising shearing mechanism, said mechanism including shearing dies arranged one in advance of the other and arranged for simultaneous action, for severing said double and said single row blanks from the sheets, end dies operating on the sheets in a position in advance of the shearing mechanism to remove end pieces therefrom for the double row blanks, and feeding devices constructed to advance the sheet a step equal to the width of two rows of can ends to be subsequently paneled out from the strip and operating in timed relation with the shearing mechanism and the end dies for feeding the sheets thereto.

9. An apparatus for cutting from metal sheets, blanks formed of a double row of can ends providing spaces and also blanks formed of a single row of can ends providing spaces, comprising shearing mechanism, said mechanism including shearing dies arranged one in advance of the other and arranged for simultaneous action, for severing said double and said single row blanks from the sheets, end dies operating on the sheets in a position in advance of the shearing mechanism to remove end pieces therefrom for the double row blanks, gauge referencing dies also operating on the sheets in a position in advance of the shearing mechanism to prepare gauge referencing edges in the sheets for both double and single row blanks, and feeding devices constructed to advance the sheet a step equal to the width of two rows of can ends to be subsequently paneled out from the strip and operating in timed relation with the shearing mechanism, the end dies and the gauge referencing dies for feeding the sheets thereto.

10. In an apparatus for cutting blanks from metal sheets in shape to have can ends and the like formed therefrom, the combination of a stationary frame, a movable crosshead, shearing mechanism including shearing dies arranged one in advance of the other and constructed for simultaneous action and having a scroll-line cut edge carried on the crosshead and coacting with a similar cut edge mounted on the frame, side walls carried by the crosshead and moving within guideways formed in the frame, said walls extending below and above the cut edge carried by the crosshead and providing exact alignment of the coacting cut edges during a part of the movement of the crosshead, and actuating mechanism for moving the crosshead and means for feeding the sheet a distance equal to the width of two rows of can ends.

11. In a machine of the class described, the combination of shearing mechanism including shearing dies arranged one in advance of the other and constructed for simultaneous action and means for advancing a sheet into position within the shearing mechanism, said advancing means comprising reciprocating feed bars carrying sheet engaging dogs pivoted thereon and spring held into sheet engaging position, and yielding devices interposed between the dogs and the feed bars for preventing damage to the parts under adverse feeding conditions said advancing means being constructed to advance the sheet for a distance equal to the width of two rows of can ends.

12. In an apparatus for cutting blanks from metal sheets in shape to have can ends and the like formed therefrom, the combination of a stationary frame, a crosshead sliding on the frame, a scroll-line cut edge carried on the crosshead and coacting with a similar cut edge mounted on the frame, said cut edges constituting parts of a shearing mechanism, a crank shaft carrying a pair of cranks and rotating within bearings carried by the frame, and pitmen and pitman stems and connecting devices interposed between the cranks and the crosshead, said devices being independently or simultaneously movable for adjusting one or other or both sides of the crosshead relative to the crank shaft to insure smooth operation of the shearing mechanism.

JOHN H. MURCH.